(12) United States Patent
Mantell (10) Patent No.: US 9,993,964 B2
(45) Date of Patent: Jun. 12, 2018

(54) METHOD AND SYSTEM FOR PRODUCING THREE-DIMENSIONAL BUILD OBJECTS

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 145 days.

(21) Appl. No.: 15/210,620

(22) Filed: Jul. 14, 2016

(65) Prior Publication Data

US 2018/0015660 A1    Jan. 18, 2018

(51) Int. Cl.
| | |
|---|---|
| *B29C 64/118* | (2017.01) |
| *B33Y 10/00* | (2015.01) |
| *B33Y 30/00* | (2015.01) |
| *B33Y 50/02* | (2015.01) |
| *B29C 64/386* | (2017.01) |
| *B29C 64/393* | (2017.01) |
| *B29C 64/106* | (2017.01) |
| *B29C 64/209* | (2017.01) |
| *B29C 64/236* | (2017.01) |

(52) U.S. Cl.
CPC .......... *B29C 64/118* (2017.08); *B29C 64/106* (2017.08); *B29C 64/209* (2017.08); *B29C 64/236* (2017.08); *B29C 64/386* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/106; B29C 64/118; B29C 64/209; B29C 64/236; B29C 64/393
See application file for complete search history.

(56) References Cited

U.S. PATENT DOCUMENTS

| | | |
|---|---|---|
| 9,073,366 B1 * | 7/2015 | Din ..................... B29C 64/112 |
| 9,186,848 B2 | 11/2015 | Mark et al. |
| 2011/0081453 A1 | 4/2011 | Axelrod |

(Continued)

FOREIGN PATENT DOCUMENTS

| | | |
|---|---|---|
| CN | 204622625 U | 9/2015 |
| EP | 2 886 277 A1 | 6/2015 |
| WO | 2016/061060 A1 | 4/2016 |

OTHER PUBLICATIONS

European Search Report corresponding to European Application No. 17 177 869.9, dated Nov. 20, 2017 (German and English language document) (6 pages).

*Primary Examiner* — Timothy Kennedy
(74) *Attorney, Agent, or Firm* — Maginot Moore & Beck LLP (57) ABSTRACT

A method of operating an extruder assembly to form a three-dimensional build object forms a build object quickly, with enhanced feature resolution, and with increased structural strength. The method includes positioning with at least one actuator an extruder having at least one opening defining an extrusion area through which build material can be extruded through the at least one opening. The extruder is positioned to cover a first portion of the extrusion area with a portion of an object supported on a build platen and to leave open a second portion of the extrusion area. The method further includes extruding a first continuous ribbon of build material adjacent to the object through the second portion of the extrusion area while moving the extruder along the object with the at least one actuator.

20 Claims, 9 Drawing Sheets

(56) References Cited

U.S. PATENT DOCUMENTS

| | | |
|---|---|---|
| 2014/0061974 A1 | 3/2014 | Tyler |
| 2014/0291886 A1 | 10/2014 | Mark et al. |
| 2015/0165682 A1* | 6/2015 | Chang ..................... B29C 64/20 425/166 |
| 2016/0151833 A1* | 6/2016 | Tsao ..................... B29C 64/135 65/60.1 |
| 2017/0182701 A1* | 6/2017 | Ryan ..................... B29C 64/106 |

* cited by examiner

METHOD AND SYSTEM FOR PRODUCING THREE-DIMENSIONAL BUILD OBJECTS

TECHNICAL FIELD

The system and method disclosed in this document relate to printers that produce three-dimensional objects and, more particularly, to extruder assemblies for such printers.

BACKGROUND

Digital three-dimensional manufacturing, also known as digital additive manufacturing, is a process of making a three-dimensional solid object of virtually any shape from a digital model. Three-dimensional object printing is an additive process in which one or more extruder or ejector assemblies form successive layers of material, for example thermoplastics such as acrylonitrile butadiene styrene ("ABS") or polylactic acid ("PLA"), on a substrate in different shapes. In some conventional three-dimensional object printers, the extruders are similar to printheads in document printers. Such extruders include an array of extruders that emit a continuous stream of material to form layers, rather than an array of ejectors that eject drops of material.

In other known three-dimensional object printers, the extruder assembly includes a single nozzle configured to extrude the build material to form layers for production of a printed object. The nozzle is generally configured as a small circular hole that emits a continuous filament of build material. The filaments are laid down in adjacent strips layer by layer to form the three-dimensional part.

In such an extruder assembly, the printed object should be formed quickly and accurately. The size of the nozzle determines both the minimum resolution of the part and the speed at which the object can be formed. An extruder having a larger nozzle can form the object more quickly, but the resolution is reduced since the formation of the adjacent strips requires that the width of a layer be equal to an integer multiple of the nozzle width. An extruder having a smaller diameter nozzle, on the other hand, can be used to form smaller details, but, since the volume extruded in each pass is small the product requires more time to produce, sometimes on the order of hours or days. Thus, in conventional three-dimensional object printers, the size of the nozzle presents a trade-off between build speed and build resolution.

One solution to this problem is to use an extruder assembly having a large nozzle for larger objects and a small nozzle for detail formation. However, such an extrusion assembly is expensive since connections, valves, and control circuitry are required for each of the nozzles. Another solution has been to build parts that are mostly hollow inside using small nozzle extruder assemblies. While building hollow parts reduces the time necessary to produce the object, the structural strength of the object is severely reduced, limiting the utility of the hollow object.

Accordingly, improvements in systems and methods for forming three-dimensional objects with printers that include extruder assemblies so the objects have greater detail, increased structural strength, and reduced production time would be beneficial.

SUMMARY

A method of operating an extruder assembly to form a three-dimensional build object forms a build object quickly, with enhanced feature resolution, and with increased structural strength. The method includes positioning with at least one actuator an extruder having at least one opening defining an extrusion area through which material can be extruded through the at least one opening. The extruder is positioned to cover a first portion of the extrusion area with a portion of an object supported on a build platen and to leave open a second portion of the extrusion area. The method further includes extruding a first continuous ribbon of build material adjacent to the object through the second portion of the extrusion area while moving the extruder along the object with the at least one actuator.

In another embodiment, an extruder assembly for a three-dimensional object printing system comprises an extruder, at least one actuator, and a controller. The extruder includes at least one opening configured to extrude a continuous ribbon of material, and the at least one opening defines an extrusion area through which material can be extruded through the at least one opening. The at least one actuator is operatively connected to the extruder and is configured to move the extruder in a horizontal plane. The controller is operably connected to the extruder, the at least one actuator, and a memory. The controller is configured to execute program instructions stored in the memory to operate the at least one actuator to position the extruder to cover a first portion of the extrusion area by a portion of an object supported on a build platen and to leave open a second portion of the extrusion area, and to operate the at least one actuator to move the extruder along the object and operate the extruder to extrude build material through the second portion of the extrusion area while operating the at least one actuator to move the extruder to extrude a first continuous ribbon of build material adjacent to the object.

BRIEF DESCRIPTION OF THE DRAWINGS

The foregoing aspects and other features of a printer having extruders and a method for operating a printer having extruders are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals have been used throughout to designate like elements.

Figure 1:
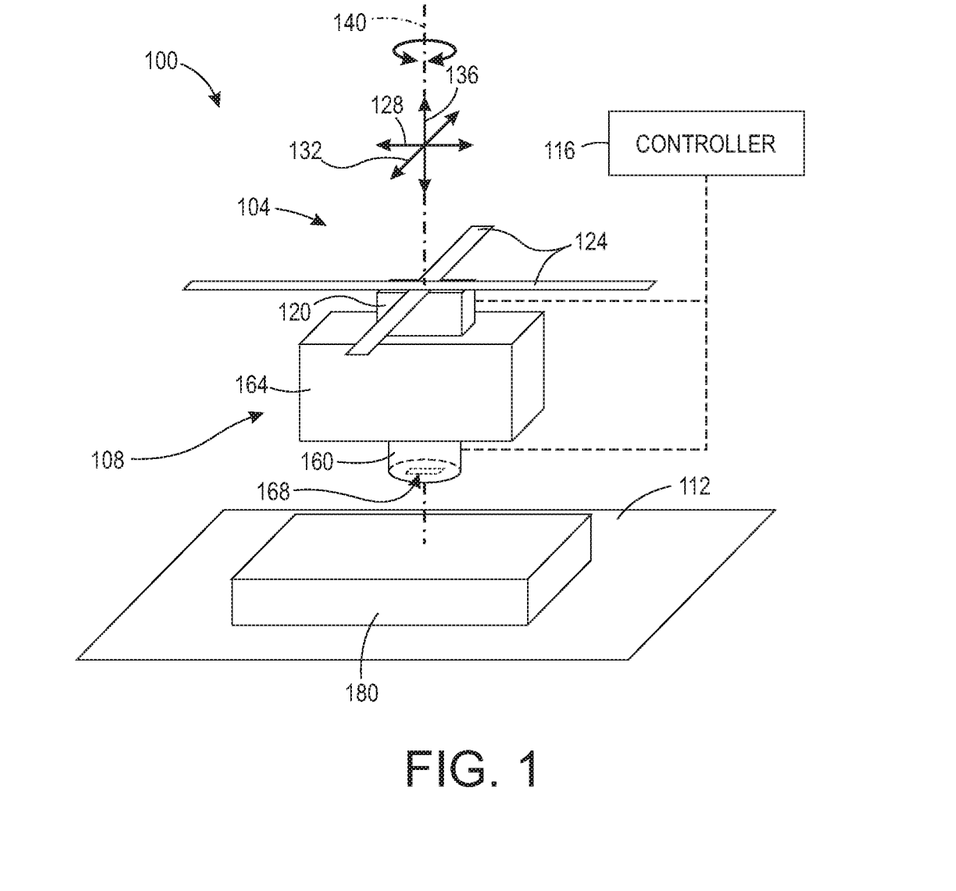
FIG. 1 is a schematic illustration of a three-dimensional object printer having an extruder assembly.

FIG. 1 illustrates a three-dimensional object printer 100. The three-dimensional object printer 100 includes an actuator assembly 104, an extruder assembly 108, a build platen 112, and a controller 116. The actuator assembly 104 includes at least one actuator 120 and a pair of rails 124 attached to a support frame (not shown). The rails 124 are configured to support the actuator 120 and the extruder assembly 108 to enable the actuator 120 to translate the extruder assembly 108 along an x-axis 128, a y-axis 132, and a z-axis 136, and rotate the extruder assembly 108 about a rotational axis 140, which is parallel to the z-axis 136 in the illustrated embodiment.

In the embodiment of FIG. 1, the actuator assembly 104 includes a single actuator 120 configured to translate the extruder assembly 108 in the x-, y-, and z-axes 128, 132, 136, respectively, and to rotate the extruder assembly 108 about the rotational axis 140. In another embodiment, the actuator assembly 104 includes a first actuator configured to move the extruder assembly 108 in the x-, y-, and z-axes 128, 132, 136, and a second actuator configured to rotate the extruder assembly 108 about the rotational axis 140. In further embodiments, the actuator 120 may be configured to translate the extruder assembly 108 in one or more of the x-, y-, and z-axes 128, 132, 136, respectively, without rotating the extruder assembly 108.

Figure 13:
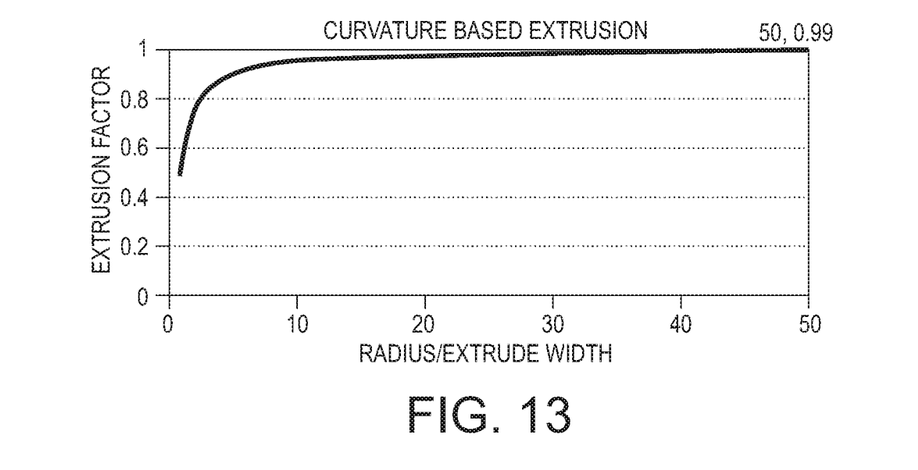
FIG. 13 illustrates a graph of extrusion factor against the ratio of radius to extrusion width for the production of curved features using the extrusion slot of FIG. 1.
Figure 14:
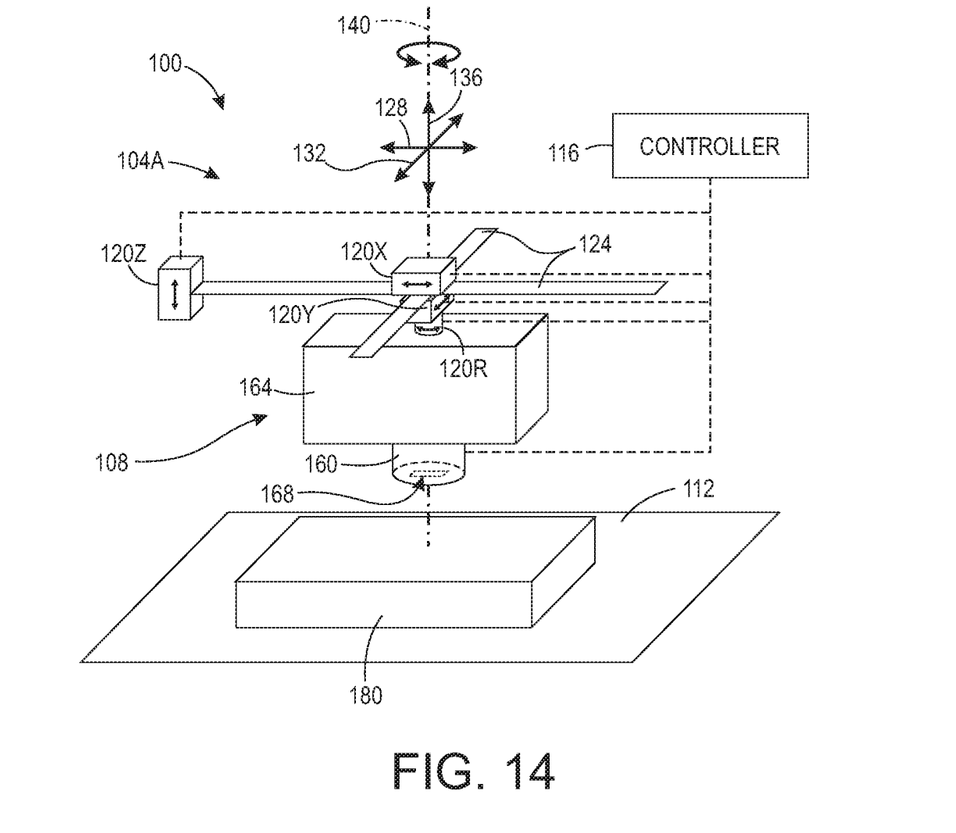
FIG. 14 is a schematic illustration of a three-dimensional object printer having an extruder assembly with an extrusion slot and including a separate actuator configured to move the extruder body in each of the x-, y-, z-, and rotational directions.

In yet another embodiment, illustrated in FIG. 13, the actuator assembly 104A includes a first actuator 120X configured to move the extruder body 164 in the x-direction 128, a second actuator 120Y configured to move the extruder body 164 in the y-direction 132, a third actuator 120Z configured to move the extruder body 164 in the z-direction 136, and a fourth actuator 120R configured to rotate the extruder body 164 about the rotational axis 140. In another embodiment, the actuator assembly 104A includes one or more of the first, second, and third actuators 120X, 120Y, and 120Z, but does not include a fourth actuator 120R.

Referring back to FIG. 1, the extruder assembly 108 includes an extruder body 160 and a reservoir 164, which is configured to store a quantity of build material. At least one extrusion opening 168 (not shown to scale in the view of FIG. 1) is defined at the bottom of the extruder body 160. The at least one extrusion opening 168 is operably connected to the reservoir 164 and is configured to extrude build material received from the reservoir 164 to form a build object 180 on the build platen 112.

In the embodiment illustrated in FIG. 1, the at least one extrusion opening 168 is a single slot-shaped opening. In one embodiment, the length of the slot-shaped extrusion opening 168 is between approximately 0.75 mm and approximately 6.4 mm and the width of the slot-shaped extrusion opening 168 is between approximately 0.2 mm and approximately 0.5 mm. In another specific embodiment, the length of the slot-shaped extrusion opening 168 is approximately 1.2 mm and the width of the slot-shaped extrusion opening 168 is approximately 0.3 mm. In other embodiments, the at least one extrusion opening 168 includes a plurality of slots or a plurality of smaller nozzles arranged in a line or in an array. In still other embodiments, the at least one extrusion opening is formed by another suitable opening or plurality of openings. In embodiments having a single extrusion opening, the dimensions of the opening define an extrusion area of the single extrusion opening through which build material can be extruded. In embodiments having more than one extrusion opening, the dimensions of each opening define an area and the sum of the areas of the multiple extrusion openings define the extrusion area through which the material can be extruded.

Figure 2:
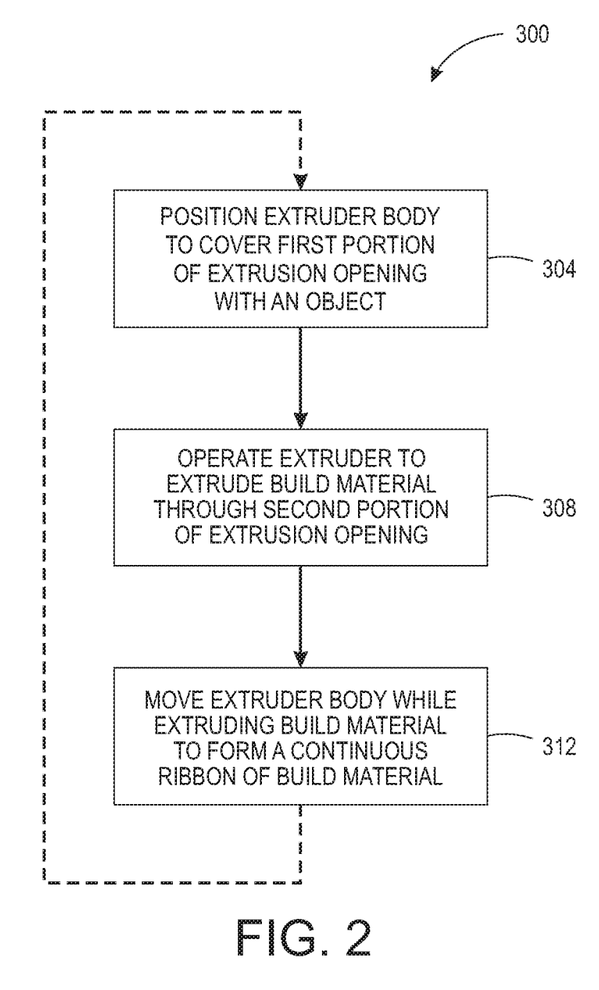
FIG. 2 illustrates a method of forming a ribbon of build material using a self-valving process during the production of a build object.

FIG. 2 illustrates a self-valving process 300 used to operate the three-dimensional object printer 100 to extrude build material to form a build object 180. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 116 of the three-dimensional object printer 100 noted above can be configured with components and programmed instructions to provide a controller or processor that performs the process 300. Alternatively, the controller can be implemented with more than one processor and associated circuitry and components, each of which is configured to form one or more tasks or functions described herein.

Figure 3:
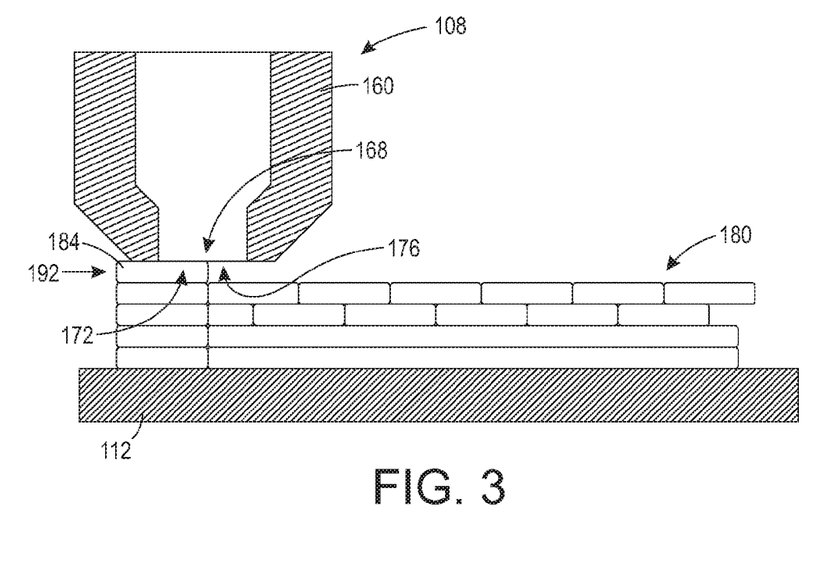
FIG. 3 illustrates a side partial cross-sectional view of the extruder body for the 3D object printer of FIG. 1 forming a ribbon of build material using the self-valving process of FIG. 2.
Figure 4:
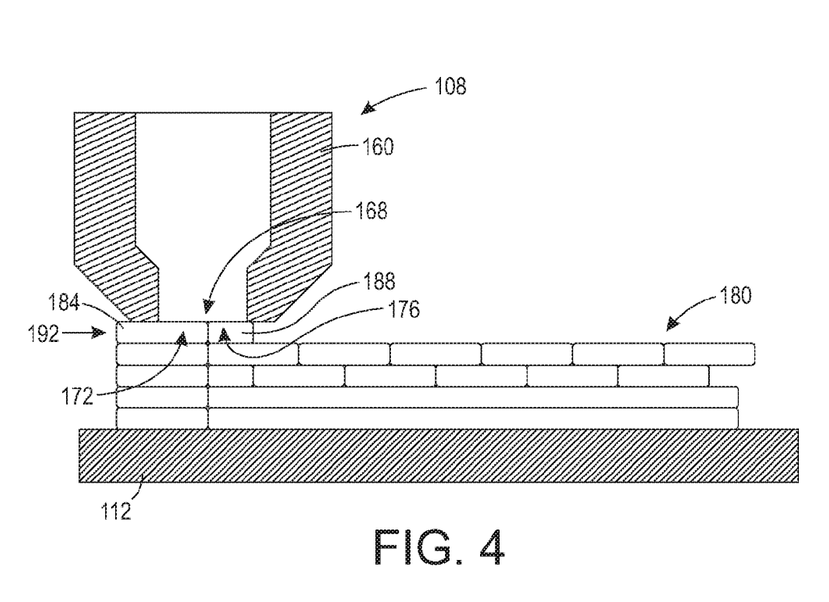
FIG. 4 illustrates another side partial cross-sectional view of the extruder body for the 3D object printer of FIG. 1 forming the ribbon of build material using the self-valving process of FIG. 2.

With reference to FIGS. 2-4, the process 300 begins with the controller 116 operating the actuator 120 to position the extruder body 160 such that a first portion 172 of the extrusion slot 168 is covered by an object 184 supported on the build platen 112, while a second portion 176 of the extrusion slot 168 is left open (block 304). In the illustrated embodiment, the object 184 covering the first portion 172 is a previously extruded ribbon of build material forming a portion of the build object 180. In other embodiments, the object covering the first portion may be a metal, wood, or plastic object around which or to which the build object is formed, for example a template or guide.

Once the extruder body 160 is positioned, the controller 116 operates the extruder assembly 108 to extrude build material through the second portion 176 of the at least one extrusion opening 168 (block 308). As the extruder assembly 108 is operated to extrude, the controller 116 operates the actuator 120 to move the extruder assembly 108 along the object 184 into the page in the view of FIGS. 3 and 4, so as to form a continuous ribbon 188 (FIG. 4) of build material adjacent to the object 184 (block 312).

In some embodiments, the controller 116 is configured to adjust the flow rate of build material extruded by the extruder assembly 108 based upon the area of the open second portion 176. For example, the controller 116 may be configured to operate the extruder assembly 108 to extrude the build material at a rate that is reduced from a maximum flow rate, which is used for extruding through the uncovered extrusion opening, by an amount that is proportional to the ratio of the covered first portion 172 to the total area of the at least one extrusion opening 168. For instance, if the covered first portion 172 is one third of the total area of the at least one extrusion opening 168, the flow rate of the extruded material would be reduced by one-third to two-thirds of the maximum flow rate.

As can be seen in FIG. 4, the strip 188 of build material has a width that is less than the width of the extrusion slot 168. Thus, the overall dimension of a given layer, for example layer 192, of the extruded build object 180 is not limited to an integer product of the width of the at least one extrusion opening 168, but instead can be formed in any desired width. Moreover, in some embodiments, the controller 116 is configured to operate the actuator 120 to move the extruder assembly 108 transversely to the direction in which the strip is formed, for example horizontally in the view of FIGS. 3 and 4 during the extrusion process, to vary the width of the strip 188 along its length.

In some embodiments, the process 300 is repeated to form multiple ribbons having width less than the width of the extrusion slot 168. In other embodiments upon completion of the process 300, the controller 116 is configured to form one or more additional ribbons adjacent to the ribbon 188, each of the additional ribbons having a width essentially equal to the width of the extrusion slot 168. Ribbons of build material are formed adjacent to one another so as to form a contiguous layer 192 of build material. In some embodiments, the controller 116 is configured to form multiple contiguous layers of build material to form the build object 180.

The configuration of the three-dimensional object printer 100 described above forms curved surfaces and fine features of the build object, while still being capable of forming wide ribbons. As a result, the printer 100 can form objects at high speeds, without sacrificing resolution of smaller features of the build object 180. Furthermore, in embodiments in which the object covering the first portion 172 of the extrusion slot 168 is a previously extruded ribbon, the adjacent ribbons overlap with one another, reducing or eliminating gaps between adjacent ribbons, thereby improving overall strength of the build object 180.

Figure 5:
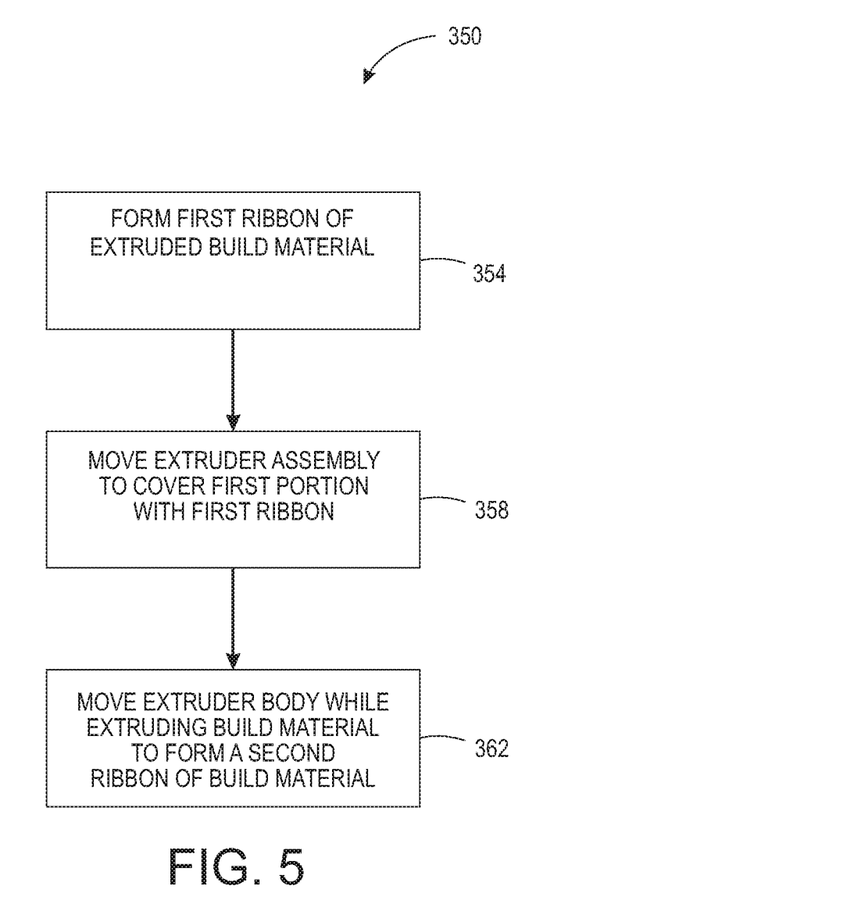
FIG. 5 illustrates a method of forming a ribbon of build material using a self-valving process during the production of a build object.

FIG. 5 illustrates another self-valving process 350 used to operate the three-dimensional object printer 100 to extrude build material to form a build object 180. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 116 of the three-dimensional object printer 100 noted above can be configured with components and programmed instructions to provide a controller or processor that performs the process 350. Alternatively, the controller can be implemented with more than one processor and associated circuitry and components, each of which is configured to form one or more tasks or functions described herein.

Figure 6:
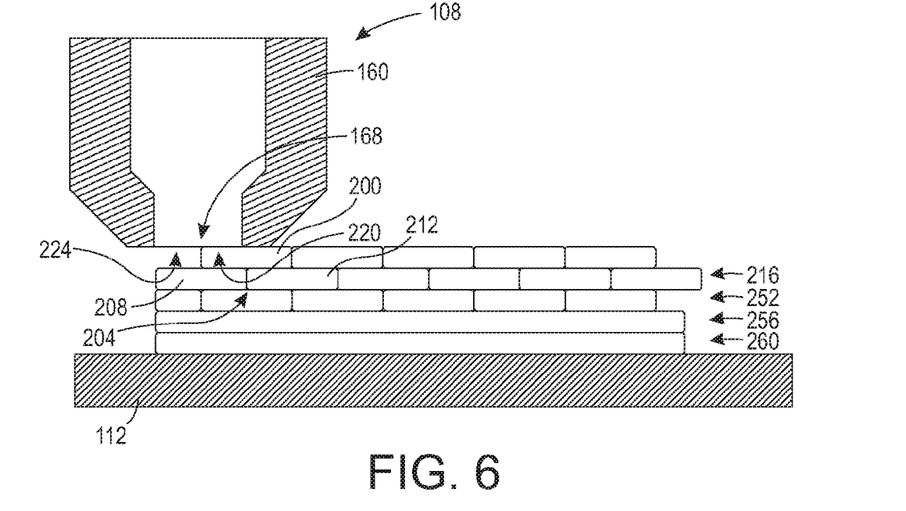
FIG. 6 illustrates a side partial cross-sectional view of the extruder body for the 3D object printer of FIG. 1 forming a ribbon of build material using the self-valving process of FIG. 4.
Figure 7:
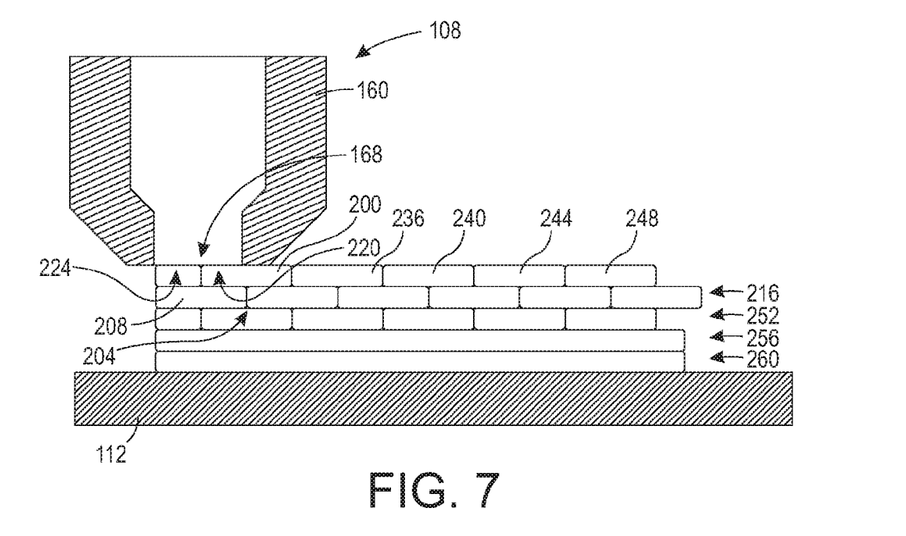
FIG. 7 illustrates another side partial cross-sectional view of the extruder body for the 3D object printer of FIG. 1 forming the ribbon of build material using the self-valving process of FIG. 4.

Referring to FIGS. 5-7, the process 350 begins with the controller 116 operating the extruder assembly 180 to extrude build material while operating the actuator 120 to move the extruder assembly to form a first ribbon 200 of build material (block 354). In the illustrated embodiment, the first ribbon 200 is centered over a seam 204 between two adjacent ribbons 208, 212, which extend in the same direction as the first ribbon 200 of the layer 216 immediately below the first ribbon 200. The first ribbon 200 and an adjacent ribbon do not have form a common joint with the adjacent ribbons 208, 212 of the layer 216 immediately below the first ribbon 200. As a result of the offset, the overall strength of the build object 180 is improved. In other embodiments, however, the first ribbon 200 may be centered offset from the seam 204, or may be aligned with the seam 204. In further embodiments, the ribbons of the layer immediately below the first ribbon 200 are oriented transversely with respect to the first ribbon, for example perpendicularly with respect to the first ribbon (as illustrated for example by layers 256 and 260) or at an angle of 45 degrees with respect to the first ribbon.

Once the first ribbon 200 is formed, the controller 116 operates the actuator 120 to move the extruder assembly 108 to a position at which a first portion 220 of the extrusion opening 168 is covered by the first ribbon 200, while a second portion 224 of the extrusion opening 168 remains open, as illustrated in FIG. 6 (block 358). In the embodiment illustrated in FIG. 6, the outer edge of the build object 180 is formed. Thus, the controller 116 operates the actuator 120 to align the outer edge of the extrusion slot 168 with the outer edge of the previously extruded layers, for example the outer edge of the ribbon 208 of lower layer 216.

The controller 116 then operates the extruder assembly 108 to extrude build material and simultaneously operates the actuator 120 to move the extruder assembly 108 so as to form a second ribbon 232 of build material adjacent to the first ribbon 200 and on top of the ribbon 208 of the lower layer 216, as illustrated in FIG. 7 (block 362). In the illustration of FIG. 7, the second ribbon 232 forms the outer edge of the build object 180. In other embodiments, the second ribbon may form a portion of the build object that is not at an outer edge and may, for example, be one of ribbons 236, 240, 244, 248. Forming intermediate ribbons overlapped with the adjacent ribbon reduces the gap present between adjacent ribbons, thereby improving the overall strength of the build object 180.

The reader should appreciate that in some embodiments, additional ribbons of build material, for example one or more of ribbons 236, 240, 244, 248, etc. may be formed between the formation of the first and second ribbons 200, 232. In other embodiments, one or more of ribbons 236, 240, 244, 248, etc. may be formed before or after the formation of the first and second ribbons.

As in the embodiment discussed above with respect to FIGS. 2-4, the embodiment of FIGS. 5-7 is also capable of forming ribbons having fine features, while also providing for quicker formation of the build object. Moreover, since the outer edge of the build object is formed by ribbons whose opposite edges are staggered with respect to the adjacent layers, no common joint exists between adjacent layers (compare FIG. 4 with FIG. 7). As a result, no common break line occurs at the interior side of the ribbons formed at the outer edge of the build object 180, thereby further improving the overall structural strength of the build object 180.

Figure 8:
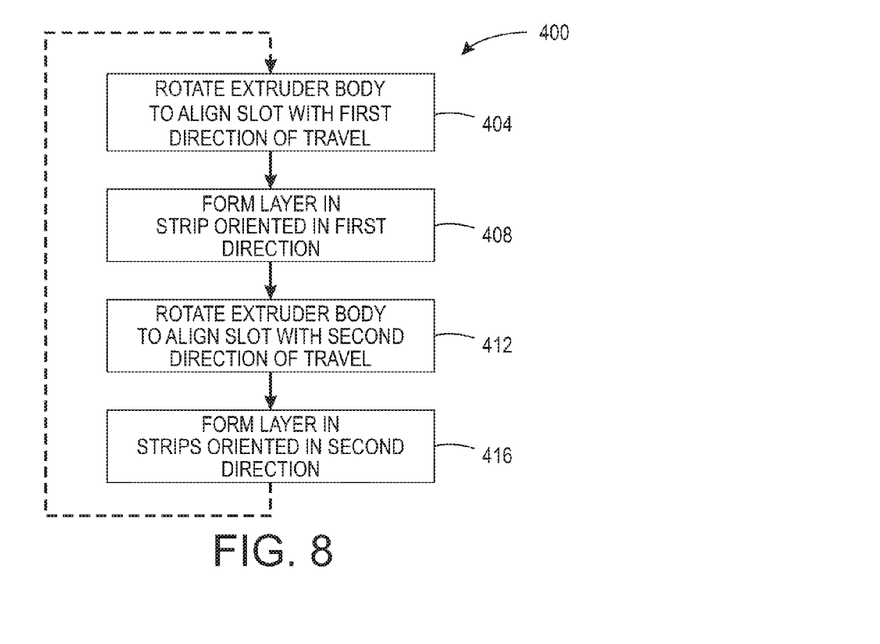
FIG. 8 illustrates a method of operating the 3D object printer of FIG. 1 to produce a build object.

In some embodiments, the controller is configured to operate the actuator 120 to form the ribbons of adjacent layers in different directions with respect to one another. FIG. 8 illustrates one process 400 used to operate the three-dimensional object printer 100 in such a manner to form a build object 180. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 116 of the three-dimensional object printer 100 noted above can be configured with components and programmed instructions to provide a controller or processor that performs the process 400. Alternatively, the controller can be implemented with more than one processor and associated circuitry and components, each of which is configured to form one or more tasks or functions described herein.

Figure 9:
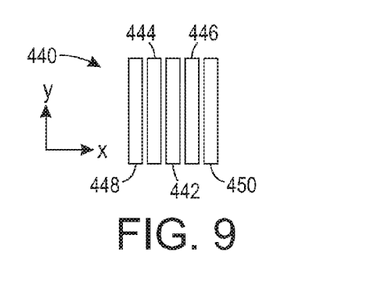
FIG. 9 illustrates a top view of a first layer produced by the 3D object printer of FIG. 1 according to the method of FIG. 10.
Figure 10:
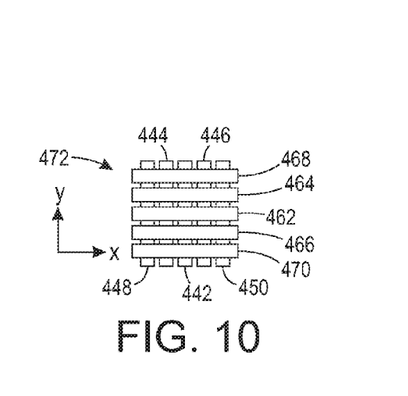
FIG. 10 illustrates a top view of the first layer of FIG. 11 and a second layer produced by the 3D object printer of FIG. 1 according to the method of FIG. 10.

With reference to FIGS. 8-10, the process 400 begins with the controller 116 operating the actuator 120 to rotate the extruder body 160 to align the width of the slot with the direction of travel for the first layer 440 (FIG. 9) (block 404). In the embodiment illustrated in FIG. 9, for example, the first direction is in the y-direction. In some embodiments, the controller 116 determines the desired direction of travel based upon the digital model of the build object. The controller 116 then operates the actuator 120 to translate the extruder body 160 in the direction of travel while extruding material from the slot 168 to extrude ribbons 442, 444, 446, 448, 450 of build material to form the first layer 440 (block 408).

In one particular embodiment, the actuator 120 moves the extruder body 160 at a speed between approximately 5000 mm/min and 8000 mm/min during the extrusion processes. In another particular embodiment, the actuator moves the extruder body 160 at a speed of approximately 6000 mm/min during the extrusion processes. One or more of the ribbons 442, 444, 446, 448, 450 may be formed using the self-valving processes 300, 350 described above with reference to FIGS. 2-7. In particular, the layers may be formed such that the lower layer 440 corresponds to the layer 256 in FIG. 7, while the upper layer 472 corresponds to the layer 252 in FIG. 7.

In some embodiments of the three-dimensional object printer, the controller 116 is configured to operate the actuator 120 and extruder assembly 108 to produce the strips 442-450 by forming the center ribbon 442 first, and then forming the adjacent ribbons 444, 446, and finally forming the outer ribbons 448, 450 to improve adhesion between the ribbons 442-450 and thus improve the structural strength of the layer. In one particular embodiment, the outer ribbons 448, 450 are formed using one of the self-valving processes 300, 350 to have a width less than the width of the other ribbons 442, 444, 446 so as to provide for the desired overall width and outer contour of the first layer 440. In another embodiment, any one or more of the ribbons 442, 444, 446, 448, 450 are formed using the self-valving processes 300, 350 described above. In other embodiments, the layers 442-450 are formed from left-to-right or right-to-left to increase layer forming speed. In some embodiments, the strips 442-450 have different widths from one another. For example, the outside strips 448, 450 may have a width that is half the width of the inner strips 442, 444, 446.

Once the first layer 440 is complete, the controller 116 operates the actuator 120 to rotate the extruder body 160 to align with the second direction (block 412). In the illustrated embodiment, the second direction is aligned with the x-direction, orthogonal to the first direction. However, the reader should appreciate that the angle between the first and second directions can be other desired angles depending on the characteristics of the build object. The controller 116 then operates the actuator 120 to translate the extruder body 160 while extruding material from the slot 168 to extrude ribbons 462, 464, 466, 468, 470 of build material, which form the second layer (block 416). One or more of the extruded ribbons 462, 464, 466, 468, 470 may be formed using the self-valving processes 300, 350 discussed above to form fine features and/or increase adhesion between adjacent ribbons.

The reader should appreciate that rotating the extruder body (blocks 404, 412) is not required in all embodiments. For example, in some embodiments of the process, the extruder body 160 is not rotated to align the width prior to moving the extruder body 160 and extruding build material (block 408). Instead, the ribbons 442, 444, 446, 448, 450 may be formed with a width that is less than the width of the extrusion slot 168 in block 408. Additionally or alternatively, in other embodiments, the extruder body 160 is not rotated to align the width of the slot prior to moving the extruder body 160 and extruding build material to form the second layer (block 416). As a result, in some of the above embodiments, the width of the ribbons 442, 444, 446, 448, 450 of the first layer 440 may be different from the ribbons 462, 464, 466, 468, 470 of the second layer 472.

If additional layers remain to be printed, the controller 116 may operate the actuator 120 to rotate the extruder body 160 to align with a third direction and form another layer in the third direction, or the controller 116 may operate the actuator 120 to repeat the processing of block 400 to produce additional layers in the first and second directions. While FIGS. 9 and 10 illustrate the ribbons 442-450, 462-470 as being separated from one another to clearly show the alignment of the ribbons 442-450, 462-470 of the different layers 440, 460, respectively, the reader should appreciate that the ribbons 442-450, 462-470 are typically formed adjacent to or overlapping with one another so as to form a continuous layer of build material.

Figure 11:
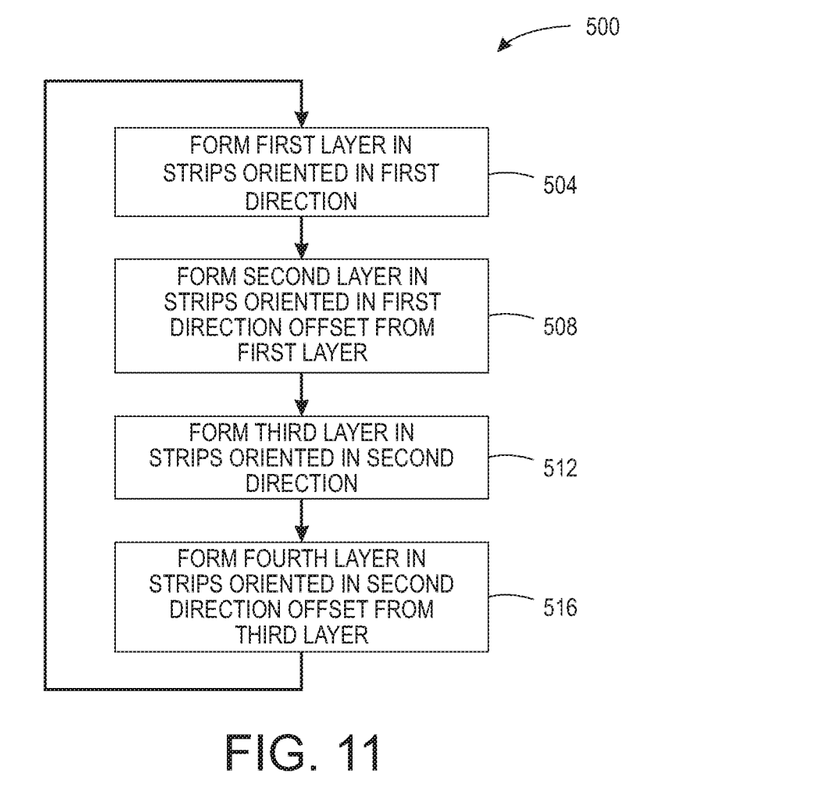
FIG. 11 illustrates a method of operating the 3D object printer of FIG. 1 to produce a build object.

FIG. 11 illustrates another process 500 used to operate the three-dimensional object printer 100 in such a manner to form a build object 180. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 116 of the three-dimensional object printer 100 noted above can be configured with components and programmed instructions to provide a controller or processor that performs the process 500. Alternatively, the controller can be implemented with more than one processor, associated circuitry, and components, each of which is configured to form one or more tasks or functions described herein.

The process 500 begins with the controller 116 operating the extruder body 160 to extrude build material and the actuator 120 to move the extruder body 160 to form a first layer of ribbons oriented in a first direction (block 504). The first layer may be formed in a similar manner as the first layer 440 discussed above with regard to FIGS. 8-10. Next, the controller 116 operates the extruder body 160 to extrude build material and the actuator 120 to move the extruder body 160 to form a second layer of ribbons oriented in the first direction (block 508). The second layer is formed offset from the first layer, such that the ribbons of the first and second layers do not have common joints. Note that in some embodiments more than two contiguous ribbons may be printed in the same direction with any ribbon being either in a different direction or being in the same direction is offset and not having common joints with its neighbors.

The process 500 proceeds with the controller 116 the extruder body 160 to extrude build material and the actuator 120 to move the extruder body 160 to form a third layer of ribbons oriented in a second direction (block 504). The third layer may be formed in a similar manner as the second layer 472 discussed above with regard to FIGS. 8-10, for example, having ribbons oriented perpendicularly with respect to the first and second layers. Next, the controller 116 operates the extruder body 160 to extrude build material and the actuator 120 to move the extruder body 160 to form a fourth layer of ribbons oriented in the second direction (block 508). The fourth layer is formed offset from the third layer, such that the ribbons of the first and second layers do not have common joints.

The layers 260, 256, 252, and 216 shown in FIGS. 6 and 7 may correspond to the first, second, third, and fourth layers, respectively, formed according to the process 500. As shown in FIGS. 6 and 7, the third and fourth layers 252, 216 are offset from one another, and the first and second layers 260, 256 are offset from one another in a similar manner, though the offset is not visible in FIGS. 6 and 7 since the ribbons of the layers 260, 256 are formed horizontally in the figures.

Figure 12:
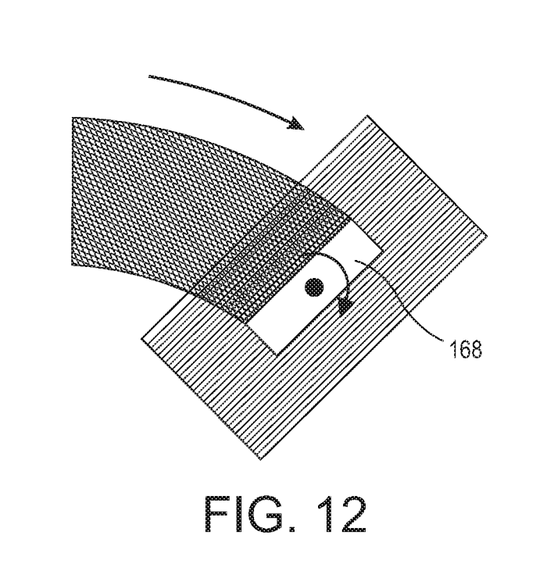
FIG. 12 illustrates a top partial schematic view of the extruder body of FIG. 1 simultaneously translating and rotating so as to form a curved feature.

In order to form curved details, the controller 116 is configured to operate the actuator 120, or, in embodiments having separate translational and rotational actuators, both the translational and rotational actuators, to rotate and translate the extruder body 160 at the same time (FIG. 11). As the extruder body 160 and the slot 168 rotate and translate, the outer edge of the slot 168 defines the outer edge of the curve, while the inner edge of the slot 168 forms the inner edge of the curve. Since the outside edge of the extrusion slot 168 travels a greater distance than the inside edge of the slot 168, an adjustment is required to the extrusion to account for the different travel distances of the inner and outer edges. In particular, when the radius of the curve is relatively small compared to the width of the slot 168, the quantity of build material extruded must be adjusted. As an example, extruding a small circle having a radius equal to the width of the slot (r) extrudes an area equal to $\pi r^2$, while the outside edge travels a linear distance of $2\pi r$. Thus, the rate of extrusion should be proportional to $\pi r^2/(2\pi r)$, or $r/2$. On the other hand, for a very large radius circle (R), the difference between the distances traveled by the inner and outer edges of the extrusion slot 168 are minimal, and the extrusion rate is proportional to the area printed ($2\pi r R$) divided by the path length ($2\pi R$), which is equal to r, or the slot width in this example. FIG. 12 illustrates a curve of the extrusion factor plotted against the ratio of the radius to extrusion width, or slot width.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of operating an extruder assembly to form a three-dimensional build object comprising:
    positioning with at least one actuator an extruder having at least one opening that defines an extrusion area through which material can be extruded from the at least one opening, the extruder being positioned to cover a first portion of the extrusion area with a portion of an object supported on a build platen and to leave open a second portion of the extrusion area; and
    extruding a first continuous ribbon of build material adjacent to the object through the second portion of the extrusion area while moving the extruder along the object with the at least one actuator.

2. The method of claim 1, the forming of the first ribbon further comprising:
    extruding the build material through the second portion of the extrusion area at a flow rate that is based on an area of the second portion of the extrusion area.

3. The method of claim 1 further comprising:
    extruding a second continuous ribbon of build material through the at least one opening while moving the extruder with the at least one actuator before extruding the first continuous ribbon of build material through the second portion of the extrusion area;
    the positioning of the extruder including positioning the extruder to cover the first portion of the extrusion area with the second continuous ribbon; and
    the first ribbon of build material is extruded adjacent to the second ribbon of build material.

4. The method of claim 3 wherein the first and second ribbons form a contiguous portion of a first layer of the build object.

5. The method of claim 4 wherein one of the first and second ribbons forms an outermost edge of the first layer.

6. The method of claim 4 further comprising:
    extruding a third continuous ribbon of build material through the at least one opening adjacent to a side of the second ribbon opposite the first ribbon, the third ribbon being extruded with the extrusion area of the at least one opening uncovered.

7. The method of claim 6 further comprising:
    extruding a fourth continuous ribbon of build material through the at least one opening prior to extruding the first and second continuous ribbons, the fourth continuous ribbon being formed with the extrusion area of the at least one opening uncovered and aligned in a same direction as the third continuous ribbon.

8. The method of claim 7, the extruding of the third ribbon further comprising:
    forming the third continuous ribbon on top of the fourth continuous ribbon and offset from the fourth continuous ribbon such that outer edges of the third and fourth continuous ribbons are not aligned with one another.

9. The method of claim 1 wherein the at least one opening defines a slot shaped extrusion area.

10. The method of claim 1 wherein the at least one opening includes a plurality of openings, each opening having an area, and the extrusion area of the plurality of openings is a sum of the areas of the openings in the plurality of openings.

11. The method of claim 1, wherein the moving of the extruder body along the object includes rotating and translating the extruder body while extruding the build material at a rate that is based on a radius of curvature of the rotation and an angle of translation of the extruder body with respect to the at least one opening.

12. An extruder assembly for a three-dimensional object printing system comprising:
    an extruder having an opening configured to extrude a continuous ribbon of material, the opening defining an extrusion area through which material can be extruded from the opening;

at least one actuator operatively connected to the extruder, the at least one actuator being configured to move the extruder in a horizontal plane; and a controller operably connected to the extruder, the at least one actuator, and a memory, the controller being configured to execute program instructions stored in the memory to:

operate the at least one actuator to position the extruder to cover a first portion of the extrusion area in the opening of the extruder by a portion of an object supported on a build platen and to leave open a second portion of the extrusion area in the opening of the extruder; and operate the at least one actuator to move the extruder along the object and operate the extruder to extrude build material through the second portion of the extrusion area in the opening of the extruder while operating the at least one actuator to move the extruder to extrude a first continuous ribbon of build material adjacent to the object.

13. The extruder assembly of claim 12, the controller being further configured to execute the program instructions to operate the extruder to extrude the build material through the second portion of the extrusion area in the opening of the extruder at a flow rate that is based on an area of the second portion of the extrusion area in the opening of the extruder.

14. The extruder assembly of claim 12, the controller being further configured to execute the program instructions to:

operate the extruder to extrude the build material through the opening of the extruder while operating the at least one actuator to move the extruder to extrude a second continuous ribbon of build material before operating the extruder and the at least one actuator to extrude the first continuous ribbon of build material;

the operating of the at least one actuator to position the extruder including positioning of the extruder to cover the first portion of the extrusion area in the opening of the extruder with the second ribbon; and the operating of the extruder and the at least one actuator to extrude the first continuous ribbon of build material including operating the at least one actuator to move the extruder along the second continuous ribbon to extrude the first ribbon adjacent to the second ribbon.

15. The extruder assembly of claim 14, the controller being further configured to execute the program instructions to operate the extruder and the at least one actuator to extrude the first and second continuous ribbons as a contiguous first layer of the build object.

16. The extruder assembly of claim 15, the controller being further configured to execute the program instructions to operate the extruder and the at least one actuator to extrude one of the first and second continuous ribbons at an outermost edge of the first layer.

17. The extruder assembly of claim 15 the controller being further configured to execute the program instructions to operate the extruder and the at least one actuator to extrude a third continuous ribbon of build material through the opening of the extruder adjacent to a side of the second continuous ribbon opposite the first continuous ribbon, the third continuous ribbon being extruded with the extrusion area in the opening of the extruder uncovered.

18. The extruder assembly of claim 17 the controller being further configured to execute the program instructions to:

operate the extruder and the at least one actuator to extrude a fourth continuous ribbon of build material through the opening of the extruder prior to operating the extruder and the at least one actuator to extrude the first and second continuous ribbons, the fourth continuous ribbon being formed with the extrusion area in the opening of the extruder uncovered and aligned in a same direction as the third continuous ribbon; and the operating of the extruder and the at least one actuator to extrude the third continuous ribbon further comprising extruding the third continuous ribbon on top of the fourth continuous ribbon and offset from the fourth continuous ribbon such that outer edges of the third and fourth continuous ribbons are not aligned with one another.

19. The extruder assembly of claim 12, wherein the opening of the extruder is a slot shaped opening defining the extrusion area.

20. The extruder assembly of claim 12, the extruder further comprising: a plurality of other openings, each opening in the plurality of other openings having an area, and the extrusion area of the extruder is a sum of the areas of the openings in the plurality of openings and the extrusion area of the opening in the extruder.

* * * * *